Feb. 14, 1956  E. R. NYLAND  2,734,750
WORK PIECE HOLDER
Filed Jan. 26, 1955  2 Sheets-Sheet 1

INVENTOR.
EDWARD R. NYLAND
BY
ATTORNEYS.

Feb. 14, 1956  E. R. NYLAND  2,734,750
WORK PIECE HOLDER
Filed Jan. 26, 1955  2 Sheets-Sheet 2

INVENTOR.
EDWARD R. NYLAND
BY
ATTORNEYS.

United States Patent Office 2,734,750
Patented Feb. 14, 1956

2,734,750

WORK PIECE HOLDER

Edward R. Nyland, Detroit, Mich.

Application January 26, 1955, Serial No. 484,101

15 Claims. (Cl. 279—2)

This invention relates to a chuck or work holder for holding a piece of work while an operation is being performed thereon. It also has to do with an improved expandable or contractable element which is flexed and caused to grip the work.

In accordance with the invention a gripping element of yieldable or elastic metal is provided, which is so shaped and formed that when subjected to axially applied pressures, a diametral dimension is varied to grip a work piece. In some instances, the diametral dimension may be increased or expanded to grip internal surfaces, and in other instances the element may be so formed that the diametral dimension is decreased thus to grip external surfaces.

An element constructed in accordance with the invention is of ring form of elastic metal, with portions of the ring segmented to increase its elasticity, and with other portions of solid ring construction, these other portions being parts wherein the diametral dimension is not effectively varied. In conjunction with the elastic element, supporting and operating elements are provided to actually carry the load of the work piece, to actuate the gripping devices, and to impart rotation to the work piece.

The invention is disclosed in the accompanying drawings which shows devices constructed in accordance with the invention.

Figure 1:
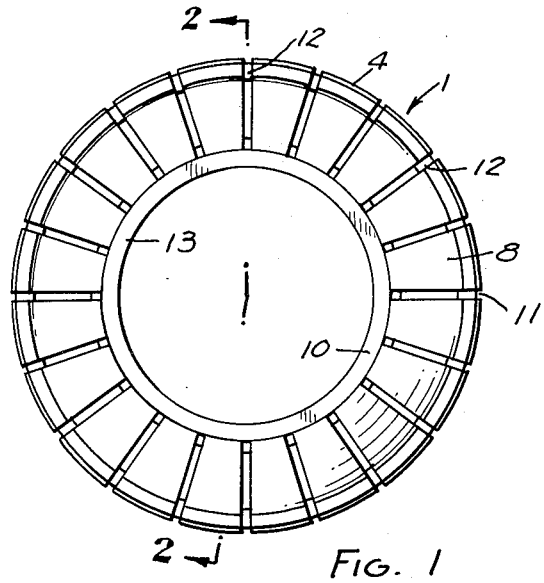
Fig. 1 is an elevational view of an elastic work gripping element.
Figure 2:
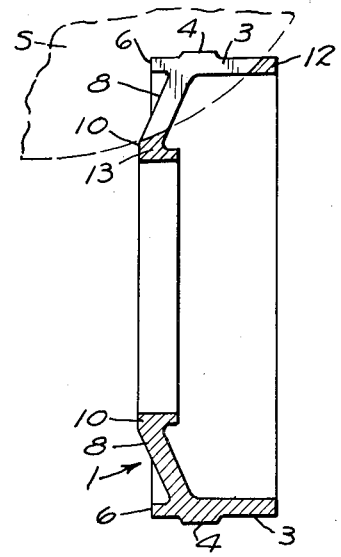
Fig. 2 is a cross sectional view taken on line 2—2 of Fig. 1.

As viewed in Figs. 1 and 2, a work engaging element or chuck element is illustrated as being generally in the form of a ring. The element is generally indicated at 1 and the cross sectional shape thereof is angular in form as shown in Fig. 2. It has an axially extending portion 3 provided with a circumferential land 4 and preferably with a circumferential extension 6. Extending inwardly from the axial portion 3 is a portion or part 8. This part 8 is preferably disposed at somewhat of an obtuse angle relative to the outer portion 3; that is to say, that the angle between the portions 3 and 8 is in excess of 90°. The portion 8 terminates in an abutment shoulder 10.

This member is made of a suitable grade of steel so that it has the requisite elasticity, as will presently be seen, and to provide for requisite elasticity, the ring is segmented throughout its circumferential extent by slots or kerfs 11. The slots 11 may be formed as illustrated in Fig. 2 wherein a cutting tool or saw is illustrated in dotted lines at S. The kerfs do not extend entirely through the ring so that the end of the axially projecting part 3 is of solid construction throughout its circumferential extent as shown at 12, and the metal forming the interior diameter is likewise of solid construction as shown at 13.

Figure 3:
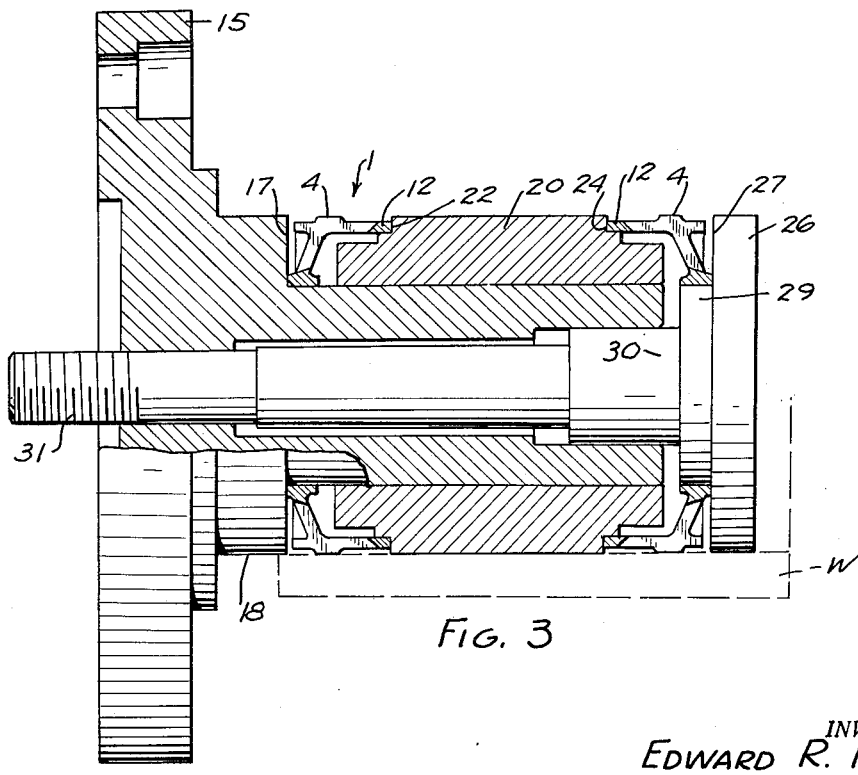
Fig. 3 is a view of a work holder showing one manner of applying the gripping device.

The application of the work engaging element is shown in Fig. 3, this figure representing but one manner of use. The tool holder as shown in Fig. 3 has a flange 15 which may be secured to a suitable machine tool for rotating the same, and an extension 16, there being a shoulder or face 17. One such element 1 is disposed upon the extension with its abutment 10 positioned against the shoulder 17. There is a sleeve 20 positioned over the extension 16 formed with a shoulder 22 for abutting against the solid ring portion 12. This sleeve is similarly formed at its opposite end with a shoulder 24 for engaging the ring portion 12 of a like but reversely positioned gripping element.

The actuator has a head 26 with a face or shoulder 27 for engaging the abutment 10 of the oppositely positioned gripping device. It also has a part 29 upon which the ring portion 13 fits. The actuator has an extension 30 which passes through a bore in the extension 16 and which may have a screw threaded end 31 for the reception of a draw bar.

With the parts thus assembled, a work piece W may be passed over the two elastic work gripping devices as shown. It will be appreciated that the head 26 and the sleeve 20 and the part 18 may be of such diameter that the work piece may freely slide thereover. The circumferential lands 4 are the portions of greater diameter, and in their normal condtion the work piece may freely slide thereover.

With the work piece in position the member 26 is pulled to the left as Fig. 3 is viewed by a suitable operating or control mechanism. The shoulder 27 engages the ring portion 13 of one gripping device and forces are communicated through this gripping device to the shoulder 24, thence the sleeve 20, thence the shoulder 22, into the opposite gripping device, and the abutment 10 of the opposite element engages the face 17. As pressure is applied the yielding elements flex with the result that there is an increase in the diameter of the land 4 of each gripping device. Each gripping device functions in the same manner so a description of one will suffice for both. The ring 12 being solid is neither expanded nor contracted and thus there is no sliding friction with the shoulders 22 and 24. Similarly, the inner ring portion 13 is not contracted, at least to any effective extent. However, the compressive force causes the angular portions 8 to straigten up, so to speak, or, in other words, to approach a true radial position. This has the effect of reducing the angle between the portions 3 and 8 and an increase in the diameter of the lands 4 to thus frictionally engage and grip the work. The tail piece 6 is preferably positioned so that ultimately it will strike the face 17 to thus relieve the portions 8 of the leverage action and limt the movement incident to the compressive forces. This saves the gripping elements from being flexed beyond their elastic limit or broken. When the work is to be released the actuator 26 is allowed to retract, the elements, due to their yielding nature, shift back to their normal position and the work can be slipped off.

Figure 5:
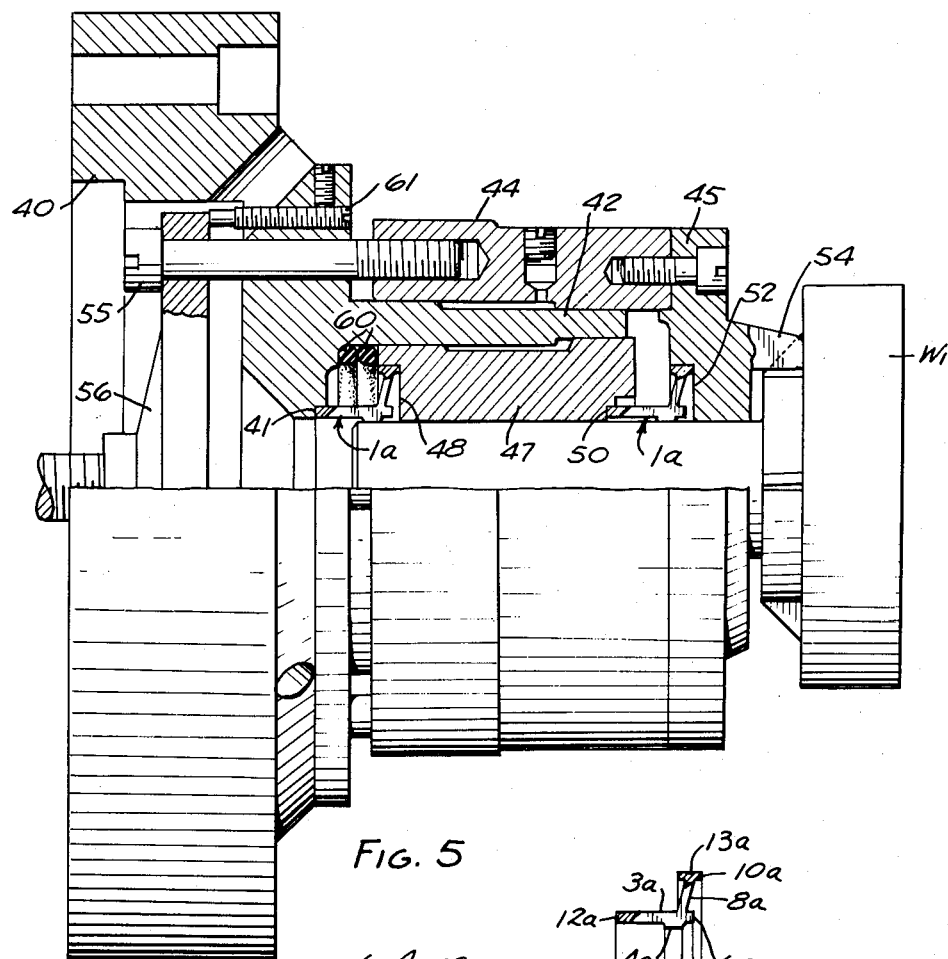
Fig. 5 is a view showing one manner in which the gripping device of Fig. 4 may be applied.
Figure 4:
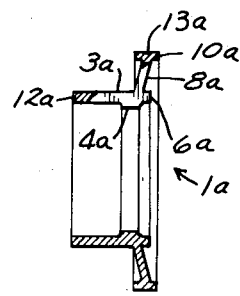
Fig. 4 is a cross sectional view of a gripping element of the type for gripping external surfaces.

The form shown in Fig. 4 is for engaging external surfaces of the work piece. This form is more or less reversed relative to the form shown in Fig. 2 and corresponding parts are indicated by the same reference character with the addition of the letter *a*. The axial part 3*a* forms the inner diameter with the lands 4*a* on the smallest ID, the portions 8 extend angularly outwardly terminating in the solid ring 13*a*. An application of the use of this form is shown in Fig. 5 wherein the chuck 40 has a portion with a shoulder 41, an extension 42 for receiving the sleeve 44 of an actuator 45. Within the extension 42 is a sleeve 47 provided with a face or shoulder 48 and a shoulder 50. The actuator 45 is provided with a shoulder or face 52.

Two gripping elements 1a are disposed as shown with the ring portions 12a positioned to engage respectively the shoulder 41 and the shoulder 50 and with the ring portions 13a for engagement with the shoulder 48 and shoulder 52. The work piece W' has a portion positioned within the gripping devices and a head portion designed to be operated upon. The work piece may be properly located by positioning its head against the projection 54. Screws 55 are connected to the control device 56 adapted to be pulled to the left as Fig. 5 is viewed. This urges the member 45 to the left and applies compressive forces to the two gripping devices, it being understood that the load exerted by the member 45 is transmitted through both gripping devices and the sliding sleeve 47. The projections 6a engage the shoulders 48 and 52 when necessary to limit the flexing load applied to the gripping members. Yieldable means 60 such as rings or washers of rubber or synthetic material, such as neoprene, may be disposed between the sleeve and the chuck so that when the pull on control device 56 is released, the neoprene rings expand and push the member 45 back to released position. The released position may be determined by one or more stop screws 61 positioned to engage the member 66. Normally the gripping devices permit the work piece to slip readily into the same telescopingly. When an axial pressure is applied, the portions 8 are straightened up toward true radial direction; the ring portions 13a do not expand to any effective extent; the interior diameter at the lands 4a is reduced by the flexing of the material to grip the work.

The segmental construction of the gripping devices permits dirt and fines to pass therethrough so that the same does not become accumulated. The number of the slots and therefore segments may vary as required to thus vary the yieldability of the gripping device for different classes of work or for different sizes of work and sizes of gripping devices. The portions 8 and 8a may be considered as extending generally radially although in the form shown in the drawings they are not on a true radial line. The gripping devices are generally L-shape in cross section but the angle between the two legs thereof is slightly in excess of the right angle and to this extent may be described as an obtuse angle. The example of the use given herein shows in both instances, the employment of two gripping elements to engage work pieces at axially spaced locations. Where a work piece need not be engaged at axially spaced locations only one gripping element may be employed.

Figures 6, 7:
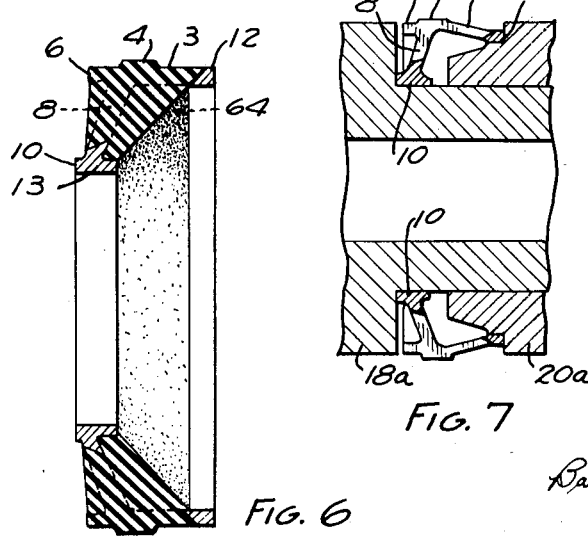
Fig. 6 is a cross sectional view illustrating a modified form of the invention.
Fig. 7 is a view similar to Fig. 6 illustrating a further modified form.

In Fig. 6 the ring structure is the same as that shown in Fig. 2, the same reference characters being applied to like parts. In this form, however, a body of rubber or synthetic rubber or plastic is applied to the ring as shown at 64. This body may extend through all of the slots as shown and appear as a fillet in the angle between the portions 8 and 3 and in the angle between the portions 8 and 6. With this form all particles of extraneous materials, fines, dust, etc., are completely sealed out of the slot construction, and, needless to say, when the gripping device shown in Fig. 6 is flexed in its operation, the body of material also flexes.

The form shown in Fig. 7 has parts which are the same as those shown in Fig. 2 and the same reference characters are applied. In this form, however, the portion 3a is inclined inwardly with the result that the solid portion 12 is on a smaller radius than the extension 6. This work holder is to be engaged between pressure applying elements indicated at 18a and 20a respectively, and when these elements are moved together the inclined formations of the parts 3a adds to the yieldability for the expansion of the land 4.

I claim:

1. A work engaging element adapted for use with a chuck or the like comprising, an integral body of elastic metal, said body being of ring form and being approximately of L-shape in cross section, one leg of the L-shape extending generally radially, the other leg of the L-shape extending generally axially, the radially inward extremity of the one leg being of unbroken annular form, the free extremity of the other leg being of unbroken annular form, the body between the unbroken annular extremities having a plurality of slots therein extending generally radially and defining a plurality of segments, the annular extremities being spaced axially from each other and adapted to be subjected to compressive forces to thereby cause the segmented body to flex and increase in outside diameter to engage an internal face of the work piece.

2. The work engaging element recited in claim 1 characterized in that the axially extending leg has an external annular land segmented by the slots and which define the maximum outside diameter of the body and which engage the surfaces of the work piece.

3. The work engaging element as recited in claim 1 characterized in that the body has a projection extending in a direction opposite that of the axially extending leg and adapted to limit the flexing of the body.

4. The work engaging element recited in claim 1 characterized in that the said one leg extends angularly relative to a true radial line and the angle between the legs is an obtuse angle.

5. The work engaging element recited in claim 1 characterized in that the said one leg extends angularly relative to a true radial line and the angle between the legs is an obtuse angle, and further characterized in that the body has an outwardly extending segmented land for engaging the work and an annular segmented projection extending in an axial direction opposite that of said other leg to limit the extent of yielding of the body.

6. A work engaging element adapted for use with a chuck or the like, comprising an integral body of elastic metal, said body being of ring form and being approximately L-shape in cross section, one leg of the L-shape extending generally radially, the other leg of the L-shape extending generally axially, the extremities of the two legs being of unbroken annular form, the body between the unbroken annular extremities having a plurality of slots therein extending generally radially and defining a plurality of segments, the annular extremities being spaced axially from each other and adapted to have compressive forces applied thereto to cause the body to yield thereby to change a diametral dimension thereof to grip a work piece.

7. The work engaging element as recited in claim 6 characterized in that a body of ruber like yieldable material is formed over the segments and lies between the unbroken annular extremities and in the slots.

8. A work engaging element adapted for use with a chuck or the like, comprising an integral body of elastic metal, said body being of ring form and being approximately of L-shape in cross section, one leg of the L-shape extending generally radially, the other leg of the L-shape extending generally axially, the said one leg having its free extremity positioned outermost and being of unbroken annular form, the free extremity of the other leg being of unbroken annular form, the body between the unbroken annular extremities having a plurality of slots therein extending generally radially and defined by a plurality of segments, said annular extremities being spaced axially from each other and adapted to be subjected to compressive forces to cause the body to yield and decrease its internal diameter to thereby engage a work piece.

9. The work engaging element recited in claim 8 characterized in that the said other leg has an internal annular segmented land for engaging the work piece.

10. The work engaging element as recited in claim 8 characterized in that the body has an annular segmented extension projecting in a direction opposite that of the said other leg and adapted to limit the extent of yielding of the body.

11. The work engaging element as recited in claim 8 characterized in that the said one leg extends at an angle to a true radial line of the ring body and that the angle between the said two legs is an obtuse angle.

12. A chuck construction comprising, a body having a shoulder, a relatively slidable element having a shoulder, a work engaging element having an integral body of elastic metal, said body being of ring form and being approximately of L-shape in cross section, one leg of the L-shape extending generally radially, the other leg of the L-shape extending generally axially, the extremities of the L-shape being of unbroken annular form, the body between the unbroken extremities having a plurality of slots therein extending generally radially and defining a plurality of segments, one said extremity being disposed against one of said shoulders, the other extremity being disposed against the other of said shoulders, and means for actuating the sliding member to apply compressive forces to said body to flex the same and effect a change in a diametral dimension of the body to cause it to grip a work piece.

13. The structure as recited in claim 12 characterized in that the body has an annular segmented projection extending in a direction opposite that of the axially extending leg of the L-shape and adapted to engage one of said shoulders to limit the flexing of the body.

14. The structure as recited in claim 12 characterized in that the unbroken annular extremity of the radially extending leg constitutes the inside diameter of the body and the axially extending leg constitutes the outside diameter of the body, whereby the body when flexed grips interior surfaces of a work piece.

15. The structure as recited in claim 12 characterized in that the unbroken annular extremity of the radially extending leg is outermost and constitutes the outside diameter of the body, and that the axially extending leg of the L-shape is innermost, whereby the body when flexed grips external surfaces of a work piece.

No references cited.